United States Patent
Steiner et al.

(10) Patent No.: US 8,965,878 B2
(45) Date of Patent: Feb. 24, 2015

(54) QUALIFIER SET CREATION FOR WORK ASSIGNMENT ENGINE

(71) Applicant: Avaya Inc., Basking Ridge, NJ (US)

(72) Inventors: Robert C. Steiner, Broomfield, CO (US); Joylee Kohler, Northglenn, CO (US); Andrew D. Flockhart, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/181,111

(22) Filed: Feb. 14, 2014

(65) Prior Publication Data
US 2014/0161248 A1    Jun. 12, 2014

Related U.S. Application Data

(62) Division of application No. 13/441,746, filed on Apr. 6, 2012, now Pat. No. 8,688,684.

(51) Int. Cl.
*G06F 17/30* (2006.01)
*H04M 3/523* (2006.01)
*G06Q 10/06* (2012.01)

(52) U.S. Cl.
CPC ............. *H04M 3/5233* (2013.01); *G06F 17/30* (2013.01); *G06Q 10/06* (2013.01)
USPC ........... 707/713; 707/706; 707/722; 707/736; 707/758; 707/781

(58) Field of Classification Search
CPC ........................................................ G06F 17/30
USPC ................................................. 707/600–899
See application file for complete search history.

(56) References Cited

U.S. PATENT DOCUMENTS

| | | | |
|---|---|---|---|
| 5,214,688 A | 5/1993 | Szlam et al. | |
| 5,953,406 A | 9/1999 | LaRue et al. | |
| 6,272,544 B1 | 8/2001 | Mullen | |
| 6,603,854 B1 | 8/2003 | Judkins et al. | |
| 6,987,846 B1 | 1/2006 | James | |
| 7,382,773 B2 | 6/2008 | Schoeneberger et al. | |
| 7,676,034 B1 | 3/2010 | Wu et al. | |
| 7,689,630 B1 | 3/2010 | Lam | |
| 8,335,704 B2 * | 12/2012 | Trefler et al. | 705/7.14 |

(Continued)

FOREIGN PATENT DOCUMENTS

EP   1209887   5/2002
WO   WO 2006/124113   11/2006

OTHER PUBLICATIONS

Official Action for U.S. Appl. No. 13/441,746, mailed Jul. 22, 2013 8 pages.

(Continued)

*Primary Examiner* — Isaac M Woo
(74) *Attorney, Agent, or Firm* — Sheridan Ross P.C.

(57) ABSTRACT

A contact center is described along with various methods and mechanisms for administering the same. The contact center proposed herein provides the ability to, among other things, define, in real-time, qualifier set combinations for work items. Thus, the contact center can create a dictionary of combinations of work item attributes that may be defined as work items are introduced to the system. The definition of the combinations allows for large qualifier sets without the large expenditure of resources to define all possible combinations of attributes for the contact center.

10 Claims, 9 Drawing Sheets

(56) References Cited

U.S. PATENT DOCUMENTS

| | | |
|---|---|---|
| 8,634,543 B2 | 1/2014 | Flockhart et al. |
| 8,688,684 B2 | 4/2014 | Steiner et al. |
| 2003/0084053 A1 | 5/2003 | Govrin et al. |
| 2006/0093124 A1 | 5/2006 | Inamdar |
| 2006/0112004 A1 | 5/2006 | Kim |
| 2006/0136490 A1 | 6/2006 | Aggarwal et al. |
| 2008/0260122 A1 | 10/2008 | Conway et al. |
| 2009/0049443 A1 | 2/2009 | Powers et al. |
| 2010/0138270 A1 | 6/2010 | Werth et al. |
| 2010/0235218 A1 | 9/2010 | Erhart et al. |
| 2010/0296417 A1 | 11/2010 | Steiner |
| 2011/0125793 A1 | 5/2011 | Erhart et al. |
| 2011/0125826 A1 | 5/2011 | Erhart et al. |
| 2011/0255685 A1 | 10/2011 | Flockhart et al. |

OTHER PUBLICATIONS

Notice of Allowance for U.S. Appl. No. 13/441,746, mailed Nov. 4, 2013 9 pages.

* cited by examiner

QUALIFIER SET CREATION FOR WORK ASSIGNMENT ENGINE

CROSS REFERENCE TO RELATED APPLICATION

The present application is a divisional of U.S. patent application Ser. No. 13/441,746, filed Apr. 6, 2012, entitled "QUALIFIER SET CREATION FOR WORK ASSIGNMENT ENGINE", which is incorporated herein by this reference in its entirety.

FIELD OF THE DISCLOSURE

The present disclosure is generally directed toward communications and more specifically toward contact centers.

BACKGROUND

The traditional notion in contact centers was that queues were required to achieve efficiencies in work distribution while also minimizing agent idle time. Unfortunately, the utilization of queues almost always results in suboptimal routing. That is an agent is often not assigned to the work item which she is most qualified to handle and vice versa.

For example, in skill-based queues a work item queue is paired with a corresponding resource queue. When work items are received at the Automated Contact Distributor (ACD), the attributes of the work item are analyzed and then the work item is placed in a specific queue based on its attributes. Similarly, when a contact center resource (often an agent) comes on line they are assigned to one or more resource queues that also have a corresponding skill set-skillset associated therewith. Since skill queues are provided in work item/resource pairs, the next available agent in a resource queue is assigned the next work item waiting in the work item queue. While there have been some solutions to make this queue and assignment structure more flexible, every solution has always been hampered by the notion of utilizing a number of queues.

In order to improve efficiency, a contact center will typically segment contacts into many different queues. This segmentation may be by service, language, media type, region, and/or customer type. This can quickly result in many thousands of queues. Each of these queues needs to be configured, managed, monitored and reported on. Also, as agents gain new skills and improve their expertise levels, there is a need to constantly reassign agents to queues. Furthermore, when an agent gains new skills there is a significant cost in administration and operational costs of the contact center. Complexity increases because agents are typically in multiple queues simultaneously, and the new skills of an agent need to be updated in all relevant queues. Updating these changes in agent skills is a time-consuming and expensive task, which usually has to be performed with some amount of manual oversight. All of these factors add significant complexity and cost to the running of the center.

Despite this, contact centers still see the need to improve efficiency and to segment work even further. This could be by revenue, age group, gender, accent or a host of other possibilities. However, contact centers are constrained from realizing these additional efficiency gains because of the sheer impracticality of managing tens of thousands of queues. The current method of improving efficiency by segmentation has reached its limits and a new mechanism is required in order to attain improved levels of efficiency.

SUMMARY

It is with respect to the above issues and other problems that the embodiments presented herein were contemplated. In particular, embodiments of the present disclosure provide an intelligent and automated mechanism that administers agent breaks.

One aspect of the present disclosure proposes a queueless contact center. One-to-one optimal matching of work items and agents can be achieved by discarding the notion that queues are required in a contact center. Instead of pre-organizing work items and resources into specific buckets or queues, the present disclosure proposes a system where ultra-fast mapping can be performed. Such ultra-fast mapping may be realized by first performing a qualification determination (i.e., determine which objects are qualified to be assigned to the newly available object), an eligibility determination (i.e., determine which of the qualified objects are eligible to be assigned to the newly available object), and a suitability determination (i.e., determine which of the eligible objects are most suitable for being assigned to the newly available object). The ultra-fast mapping may be accomplished through the creation and management of bitmaps.

One general algorithm which may be utilized to achieve the above-noted goals in a contact center environment includes: (1) create "pools" (unordered collections), one for all resources in a contact center, one for all work items in the contact center, and one for all qualifier sets in the contact center; and (2) for each pool, create a qualification bitmap. One bit for each entry is provided in the qualification bitmap. The bitmap can be used to speed up complex scans of pools, especially during the qualification determination and even during the eligibility determination.

The embodiments herein provide a way to intelligently build the universe of possible qualifier sets (i.e., bitmaps) for the core match maker (e.g., the work assignment engine that actually matches work items to resources). In particular, a service matcher is provided that can extract the dictionaries and the qualifier set mapping from the core match maker and may front the translation service in a single element. This element can be deployed as an application or a simple extension to the core match maker.

Specifically, the service matcher can have the same functionality as the core match maker (e.g., the ability to compare bitmaps for a work item with bitmaps describing the previously-defined qualifier sets). In embodiments, the core match maker functionality can be duplicated in the service matcher, and the service matcher can build the universe of qualifier sets for the core match maker. As a new piece of work arrives, the work can be assigned its qualifier set (e.g., contact type, language, skill requirements, importance, etc.) and then the qualifier set for the work may be analyzed by the service matcher.

If the service matcher has previously created and/or stored the qualifier set (e.g., the qualifier set has already been defined in its dictionary), then the service matcher passes the work to the core match maker for routing. If the service matcher has not seen the qualifier set, then the service matcher can scan agents for that have similar qualifier sets, i.e., agent(s) with the skills to do this kind of work as represented by the same attributes. These work items may then be added to the system. Finally, the qualifier set associated with the added work item can be added to the qualifier set dictionary, and the work continues on to the match maker. Accordingly, the vocabulary in the dictionary is progressively built as work comes into the contact center.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
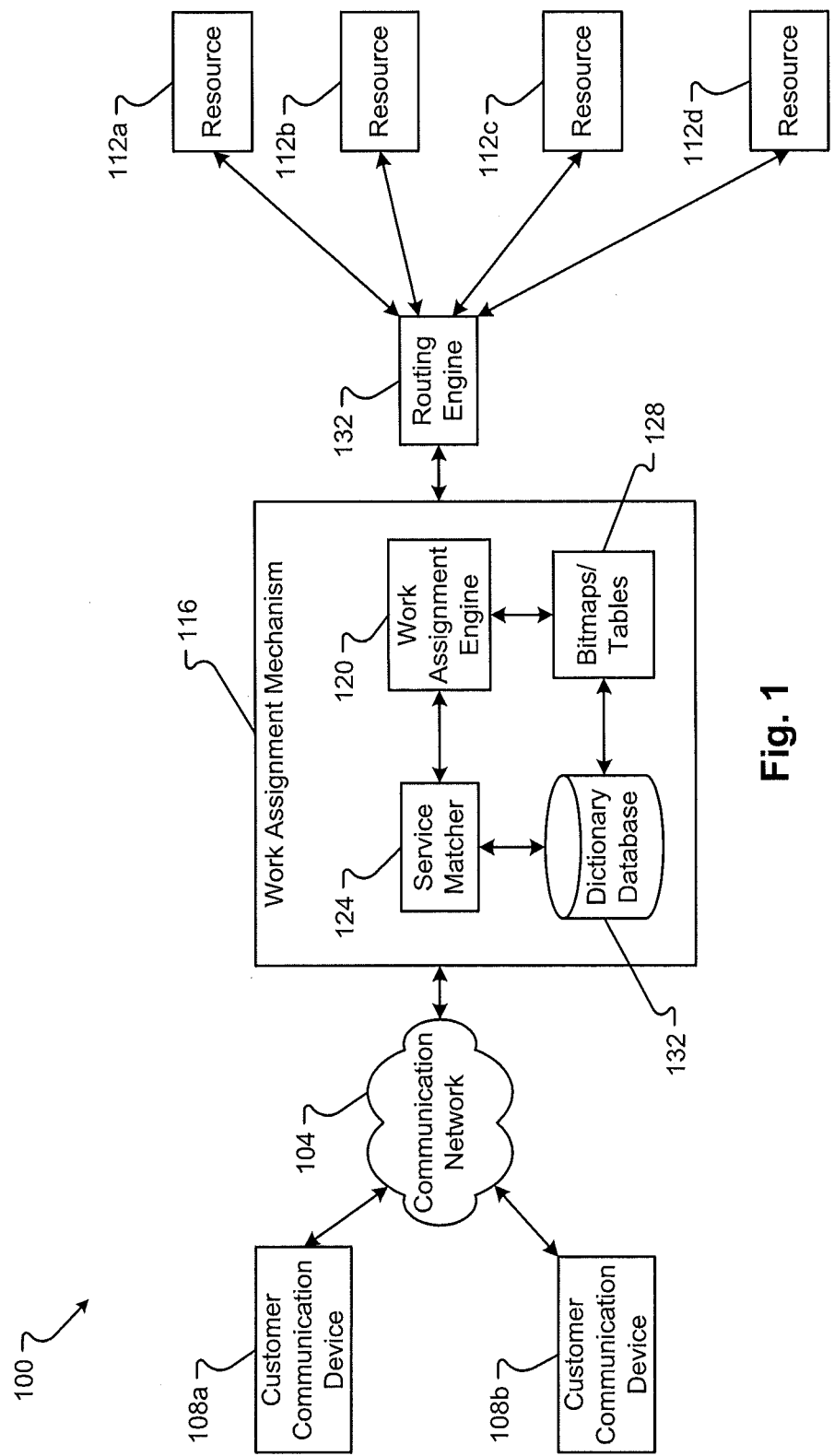
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser.

No. 12/469,523 to Steiner, the entire contents of which are hereby incorporated by reference for all that it teaches and for all purposes. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety for all that they each teach and for all purposes.

The format of the work item may depend upon the capabilities of the communication device 108 and the format of the communication. Moreover, as will be described in further detail herein, the work item may either correspond to a traditional type of work item. In some embodiments, work items are logical representations within a contact center of work to be performed in connection with servicing a communication received at the contact center (and more specifically the work assignment mechanism 116).

With respect to the traditional type of work item, the communication associated with a work item may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference for all that it teaches and for all purposes.

More specifically, the work assignment engine 120 can generate bitmaps/tables 128 and determine, based on an analysis of the bitmaps/tables 128, which of the plurality of processing resources 112 is eligible and/or qualified to receive a work item and further determine which of the plurality of processing resources 112 is best suited to handle the processing needs of the work item. In situations of work item surplus, the work assignment engine 120 can also make the opposite determination (i.e., determine optimal assignment of a work item to a resource). In some embodiments, the work assignment engine 120 is configured to achieve true one-to-one matching by utilizing the bitmaps/tables 128 and any other similar type of data structure.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

The dictionary database 132 can store qualifier set definitions. The dictionary database 132 can be any type of data structure or database including, but not limited to, a flat file, a hierarchical database, a relational database, etc. As such, as the service matcher 124 defines qualifier set definitions, the service matcher 124 can store the qualifier set definitions in the dictionary database 132. The qualifier set definitions in the dictionary 132 can remain and be searched by the service matcher 124. In embodiments, the dictionary 132 can include one or more qualifier set definitions. When receiving a new work item, the service matcher 124 may determine if a qualifier set definition is already defined in the dictionary 132. If the qualifier set definition is found in the dictionary 132, the service matcher 124 can provide the definition to the work assignment engine 120. If the qualifier set definition does not exist, the service matcher 124 can create the qualifier set definition, provide it to the work assignment engine 132, and store the qualifier set definition in the dictionary database 132. Periodically, the service matcher 124 may manage the qualifier set definitions in the dictionary database 132 by removing old qualifier set definitions or reorganizing the qualifier set definitions in the dictionary database 132.

Figure 2:
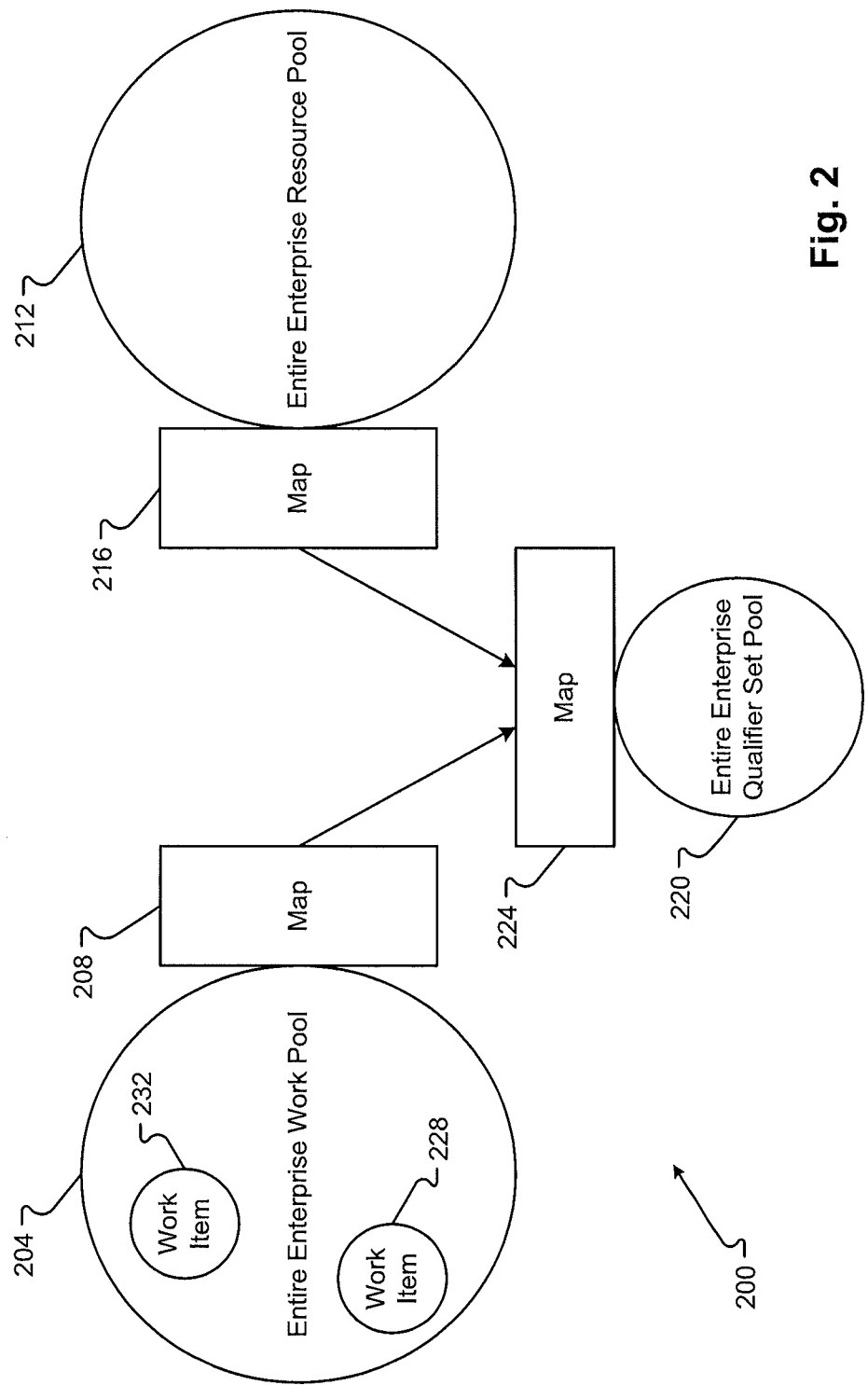
FIG. 2 is a block diagram depicting pools and bitmaps that are utilized in accordance with embodiments of the present disclosure.

FIG. 2 depicts exemplary data structures 200 which may be incorporated in or used to generate the bitmaps/tables 128 used by the work assignment engine 120. The exemplary data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item 228 within the contact center at any given time.

In some embodiments, the population of the work pool 204 may be limited to work items 228, 232 waiting for service by or assignment to a resource 112, but such a limitation does not necessarily need to be imposed. Rather, the work pool 204 may contain data instances for all work items 228, 232 in the contact center regardless of whether such work items are currently assigned and being serviced by a resource 112 or not. The differentiation between whether a work item 228, 232 is being serviced (i.e., is assigned to a resource 112) may simply be accounted for by altering a bit value in that work item's data instance. Alteration of such a bit value may result in the work item 228, 232 being disqualified for further assignment to another resource 112 unless and until that particular bit value is changed back to a value representing the fact that the work item 228, 232 is not assigned to a resource 112, thereby making that resource 112 eligible to receive another work item 228, 232.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item 228, 232 or because a human agent is not logged-in. The ineligibility of a resource 112 may be reflected in one or more bit values.

The qualifier set pool 220 comprises a data entry or data instance for each qualifier set within the contact center. A qualifier set can be a collection of attributes (e.g., contact type, language, skill requirements, importance, etc.) arranged in a predetermined order that can be analyzed by the service matcher 124. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item 228, 232 in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224.

In some embodiments, the bitmaps are utilized to speed up complex scans of the pools and help the work assignment engine 120 make an optimal work item/resource assignment decision based on the current state of each pool. Accordingly, the values in the bitmaps 208, 216, 224 may be recalculated each time the state of a pool changes (e.g., when a work item surplus is detected, when a resource surplus is detected, etc.).

Figure 3:
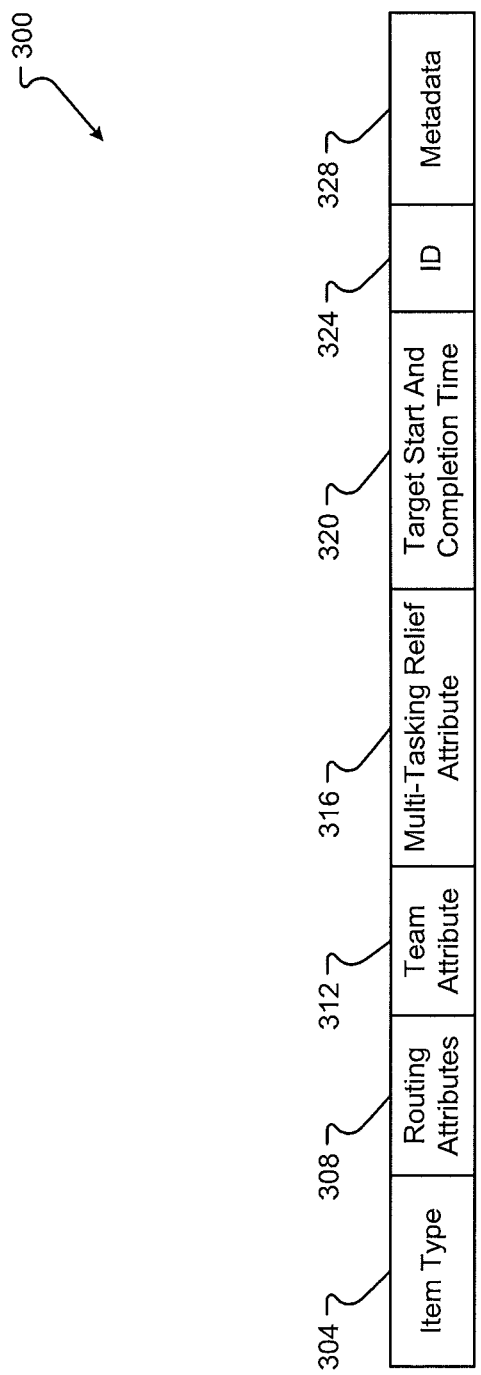
FIG. 3 is a block diagram depicting a data structure used in accordance with embodiments of the present disclosure.

With reference now to FIG. 3, additional details of a data structure 300 used to define work items 228, 232 in the work pool 204 will be described in accordance with embodiments of the present disclosure. Specifically, each work item 228, 232 may have a corresponding data structure 300 which defines the type of work item in an item type information field 304, how to route the work item in a routing attributes information field 308, whether to assign the work item to a plurality of resources in a team attribute information field 312, whether to provide multi-tasking relief in a multi-tasking relief attributes information field 316, and target service objectives in a service objective information field 320.

In some embodiments, the item type information field 304 may comprise one or more bits which describe whether the subject work item is a traditional work item associated with a customer contact and requiring servicing by a resource 112. Any type of indicator, token, or descriptor may be used to indicate whether the work item is a traditional work item in the item type information field 304.

The routing attributes information field 308 may comprise data that describes the attributes of a work item. As noted above, the attributes of a work item 228, 232 may be in the form of one or more bits (e.g., bit values in a bitmap 208) indicating whether the work item 228, 232 has a particular attribute or not. Of course, other mechanisms of data description (e.g., strings, characters, alphanumeric values, equations, etc.) may be used to describe the attributes of a work item in the routing attributes information field 308.

The team attribute information field 312 may correspond to a separate information field as shown or it may be included in the routing attributes information field 308. In some embodiments, the team attribute information field 312 may also comprise one or more bits or bit values which identify whether a work item is to be assigned to a single resource 112 or multiple resources 112 simultaneously.

The service level objective information field 320 may comprise information which describes any type of service level objective or sets of objectives for work items (e.g., target start time, target completion time, maximum wait time, minimum skill requirements, etc. It should be appreciated that the information in the service level objective information field 320 may be maintained at bit values, scalar values, or any other way of describing service level objectives for a single work item or collection of work items.

The data structure 300 can also include information about the combination that the work item is associated, i.e., the qualifier set attributes. Thus, if the work item includes a defined combination of characteristics, the data structure 300 can identify the combination. For example, the data structure 300 may include an identifier 324 (e.g., a qualifier set identifier as explained above) that identifies the qualifier set uniquely amongst the possible combinations. The identifier 324 can be numeric, alphanumeric, a code, or other identifier. The data structure 300 can store the identifier to allow the service matcher 124 and/or the work assignment engine 120 to quickly identify work items that have the same or similar bitmap attributes. In other embodiments, the data structure 300 may not contain the identifier 324, but the service matcher 124 and/or the work assignment engine 120 can organize the qualifier sets in the pools such that like qualifier sets are easily recognized and counted. For example, the qualifier set definitions may be organized from most significant bits to least significant bits. This organization can allow for quick searching and recognition of similarities as understood in the art.

In embodiments, the data structure 300 may also include one or more items of metadata 328. Metadata 328 can include information used to organize or search for work items. For example, the metadata 328 may include a hash value or calculation from the bits in the qualifier set that can identify the qualifier set and indicate similarity to other bitmaps. Other metadata 328 can include information about the qualifier set. For example, the metadata 328 may include a date or time when the qualifier set definition was created, if new, how often the qualifier set definition is used, the last date/time when the qualifier set definition was used, etc. The qualifier set definition information in the metadata 328 can be used to manage the qualifier set definitions. Thus, if old or unused qualifier set definitions are removed from the dictionary, the metadata 328 can be searched to determine which qualifier set definitions to remove.

Figure 4:
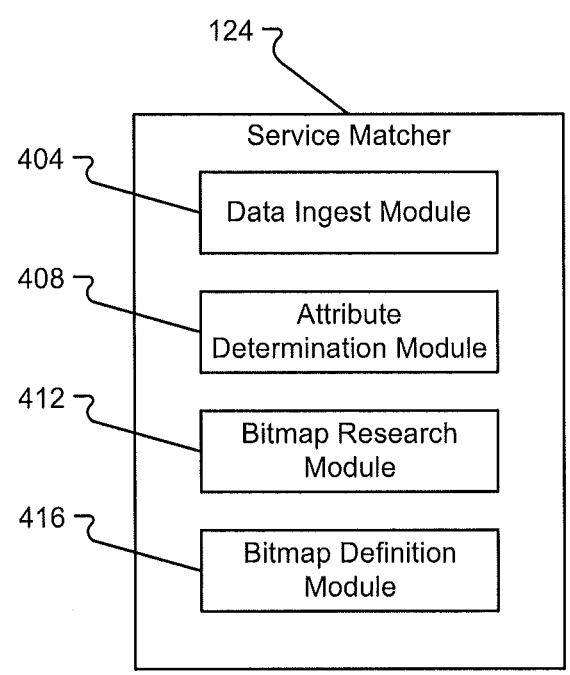
FIG. 4 is a block diagram depicting a Service Matcher used in accordance with embodiments of the present disclosure.

An embodiment of the service matcher 124 is shown in FIG. 4. The service matcher 124 can be hardware or software. Further, the service matcher 124 may be a component of the work assignment mechanism 116 or a device or component of a separate device or system either independent from the work assignment mechanism 116 and/or operated by a third party. The service matcher 124 may include one or more of, but is not limited to, a data ingest module 404, an attribute determination module 408, a bitmap research module 412, and/or a bitmap definition module 416.

The data ingest module 404 may receive and process information regarding a work item. Thus, when a new work item arrives at the work assignment mechanism 116 or, at least, before the work item is processed by the work assignment engine 120, the data ingest module 404 can pre-process the work item. The data ingest module 404 may extract information about the work item from various sources, for example, IVR systems, email header information, caller identity data, etc. Generally, information used to process or create the bitmap may be collected by the data ingest module 404. This information may then be provided to the attribute determination module 408.

The attribute determination module 408 can, from the information received from the data ingest module 404, determine which attributes in the bitmap the work item possesses. Thus, the attribute determination module 408 can create an initial bitmap. The initial bitmap can be provided to the bitmap research module 412.

To determine if the combination of attributes in the initial bitmap has been received previously and is part of a previously created qualifier set definition, the bitmap research module 412 may search the dictionary database 132 for the qualifier set definition defined by the initial bitmap. In embodiments, the bitmap research module 412 determines an identifier 324 for the qualifier set and searches the dictionary database 132 for the identifier 324. In other embodiments, the bitmap research module 412 can calculate a hash or other signature for the qualifier set and can search the dictionary database 132 for the hash or signature. In still other embodiments, the bitmap research module 412 may search the dictionary database 132 based on the order of the bits from the most significant to least significant bits (or vice versa) to find a similar or same qualifier set definition. The results of the search can be provided to the bitmap definition module 416.

A bitmap definition module 416 can define the new qualifier set definition. For example, if the bitmap research module 412 fails to find the current qualifier set in the dictionary database 132, the bitmap definition module 416 can define the new bitmap in the dictionary database 132 as a new qualifier set definition. Thus, a new instance of the qualifier set received for this work item and possibly future work items would thereinafter be defined for the work assignment mechanism 116. In alternative embodiments, if the bitmap research module 412 does find the qualifier set definition in the dictionary database 132, the bitmap definition module 416 can provide the qualifier set information about the previously created and stored qualifier set definition to the work assignment mechanism 116. Thus, the bitmap definition module 416 can also pass through work items if no new qualifier set definition is to be defined.

Figure 5A:
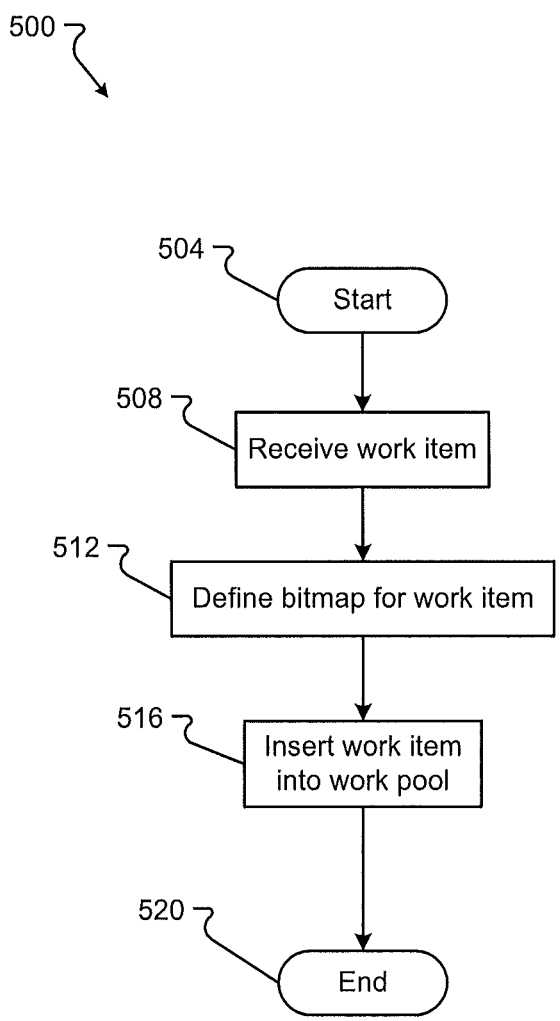
FIGS. 5A and 5B are flow diagrams depicting methods of assigning work items in a contact center in accordance with embodiments of the present disclosure.

An embodiment of a method for assigning work items in a contact center is shown in FIG. 5A. Generally, the method 500 begins with a start operation 504 and terminates with an end operation 520. While a general order for the steps of the method 500 is shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, etc. described in conjunction with FIGS. 1-4.

The method 500 begins with the service matcher 124 receiving a work item 228, 232 in the work pool 204, in step 504. In particular, the service matcher 124 may determine if the qualifier set associated with the work item 228, 232 has been defined before passing the work item 228, 232 to the work assignment engine 120. This step may involve doing a bitmap comparison between one or more of the bitmaps 208, 216, 224 as described above.

Figure 5B:
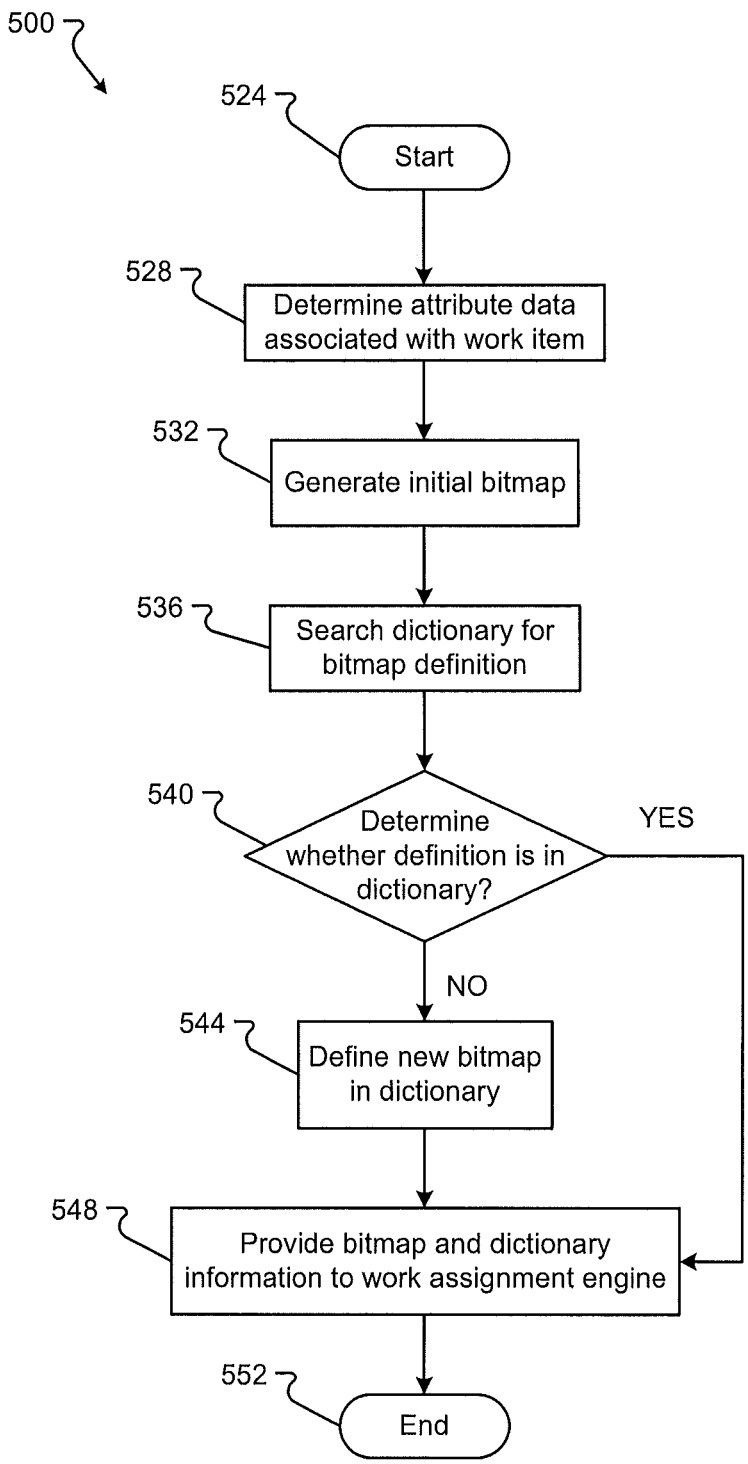

If there is no qualifier set definition in the dictionary 132, the service matcher 124 can create or define the qualifier set definition for the work item 228, 232, in step 512, as described further in conjunction with FIG. 5B. Based on the analysis of the work pool 204, the work assignment engine 120 reviews resources that may possibly match the new qualifier set. If the resource may be capable of administering to the work item 228, 232, then the dictionary 132 can send the information to the work assignment engine 120 that the identified types of resources can be included in set of candidate resources.

In alternative embodiments, the work assignment engine 120 identifies a first resource 112 among the plurality of resources 112 in the resource pool 212 that is "best suited" to receive a work item 228, 232, in step 516. In particular, the work assignment engine 120 may follow a process by which it first determines which resources among the plurality of resources are available/eligible to receive the work item 228, 232 and then identifies which among the available/eligible resources is best suited to have the work item 228, 232 assigned thereto. The process of identifying the best suited resource 112 may involve comparing the attributes of all eligible resources with the attributes of the work item 228, 232 being assigned and then determining which resource 112 has attributes that best match the attributes of the work item 228, 232 being assigned. Then, the work assignment engine may instruct the routing engine 132 to route the contact associated with the assigned work item 228 to the selected resource 112. Thereafter, the method 500 may return to step 504.

An embodiment of a method for defining a qualifier set definition is shown in FIG. 5B. Generally, the method 500 begins with a start operation 524 and terminates with an end operation 552. While a general order for the steps of the method 500 is shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, etc. described in conjunction with FIGS. 1-5A.

In embodiments, the data ingest module 404 receives or determines information associated with the work item 328. The information can be provided to the attribute determination module 408. The attribute determination module 408 can then determine the attribute data associated with the work item by analyzing the received or determined information, in step 528. The determined attribute data may be organized. The attribute determination module 408, in embodiments, can generate an initial bitmap from the attribute data, in step 532. The initial bitmap may be provided to the bitmap research module 412.

The bitmap research module 412 can then search the dictionary database 132 for a qualifier set definition similar to or the same as the initial bitmap, in step 536. As explained previously, the bitmap research module 412 may search for an identifier, hash value, or other information, in the identifier field 324 or in metadata 328. Further, the bitmap research module 412 can use other lookup methods or database processes to determine if a qualifier set definition exists. The bitmap research module 412 can then determine if the identifier or information is found, in step 540. If the identifier or information is found, the method 500 proceeds YES to step 548. However, if no identifier or information is found, the method 500 proceeds NO to step 544.

In step 544, the bitmap research module 412 can provide the new bitmap to the bitmap definition module 416. The bitmap definition module 416 may then define the new qualifier set definition and store the qualifier set definition in the dictionary database 132. In creating the qualifier set definition, the bitmap definition module 416 can store the attribute data in fields 304 through 316 of the data structure 300. Further, the bitmap definition module 416 can create a new or sequential identifier (i.e., identifiers 324 may be created in sequence and the next identifier is assigned) and store the identifier in field 324. In embodiments, the bitmap definition module 416 can also define metadata 328. For example, the bitmap definition module 416 can determine a hash value or other signature from data in the qualifier set. The hash value or signature may be stored in the metadata field 328. Other metadata may be created and stored in the metadata field 328 to identify the qualifier set definition. After the qualifier set definition is created or after the qualifier set definition is retrieved from the dictionary database 132, the bitmap definition module 416 can provide the qualifier set and any qualifier set definition information (e.g., the identifier 324 or the metadata 328) to the work assignment engine 120, in step 548. A qualifier set definition can be common between two or more work items in the work pool.

Figure 6:
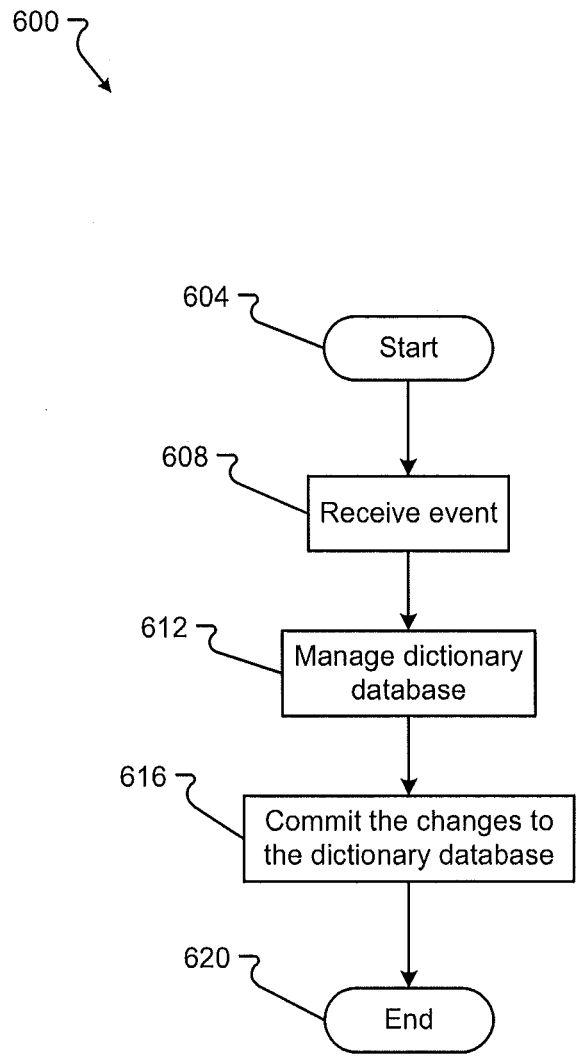
FIG. 6 is a flow diagram depicting a method for managing a dictionary database of bitmap definitions in accordance with embodiments of the present disclosure.

An embodiment of a method for assigning work items in a contact center is shown in FIG. 6. Generally, the method 600 begins with a start operation 604 and terminates with an end operation 620. While a general order for the steps of the method 600 is shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, software, data structures, etc. described in conjunction with FIGS. 1-5B.

The bitmap definition module 416 or the bitmap research module 412 may receive an event, in step 608. An event can be any trigger that may cause the bitmap definition module 416 or the bitmap research module 412 to manage the qualifier set definitions in the dictionary database 132. For example, the event can be a time or expiration of a time—such as a periodic time that triggers the management of the dictionary database 132. Another example of an event may be a user interface input received to manage the database 132 either automatically or according to further user input. Other events may include triggers based on information about the dictionary database 132 (e.g., size of the database 132, amount of available space in the database 132, etc.), triggers based on work pool 204, the enterprise qualifier set pool 220, the enterprise resource pool, components included in the work assignment mechanism 116, etc., or other information.

In response to receiving the event, the bitmap definition module 416 or the bitmap research module 412 can manage the dictionary database 132, in step 612. Managing the dictionary database 132 may mean organizing the qualifier set definitions based on attribute data, deleting unused or "stale" qualifier set definitions (qualifier set definitions that have not been retrieved for a predetermined amount of time), predicting or creating new qualifier set definitions (without input of a work assignment) based on trends developed from past-received work items, or making other changes to the dictionary database 132. These changes may be made and then the newly managed database 132 can be stored or completed, in step 616.

Figure 7:
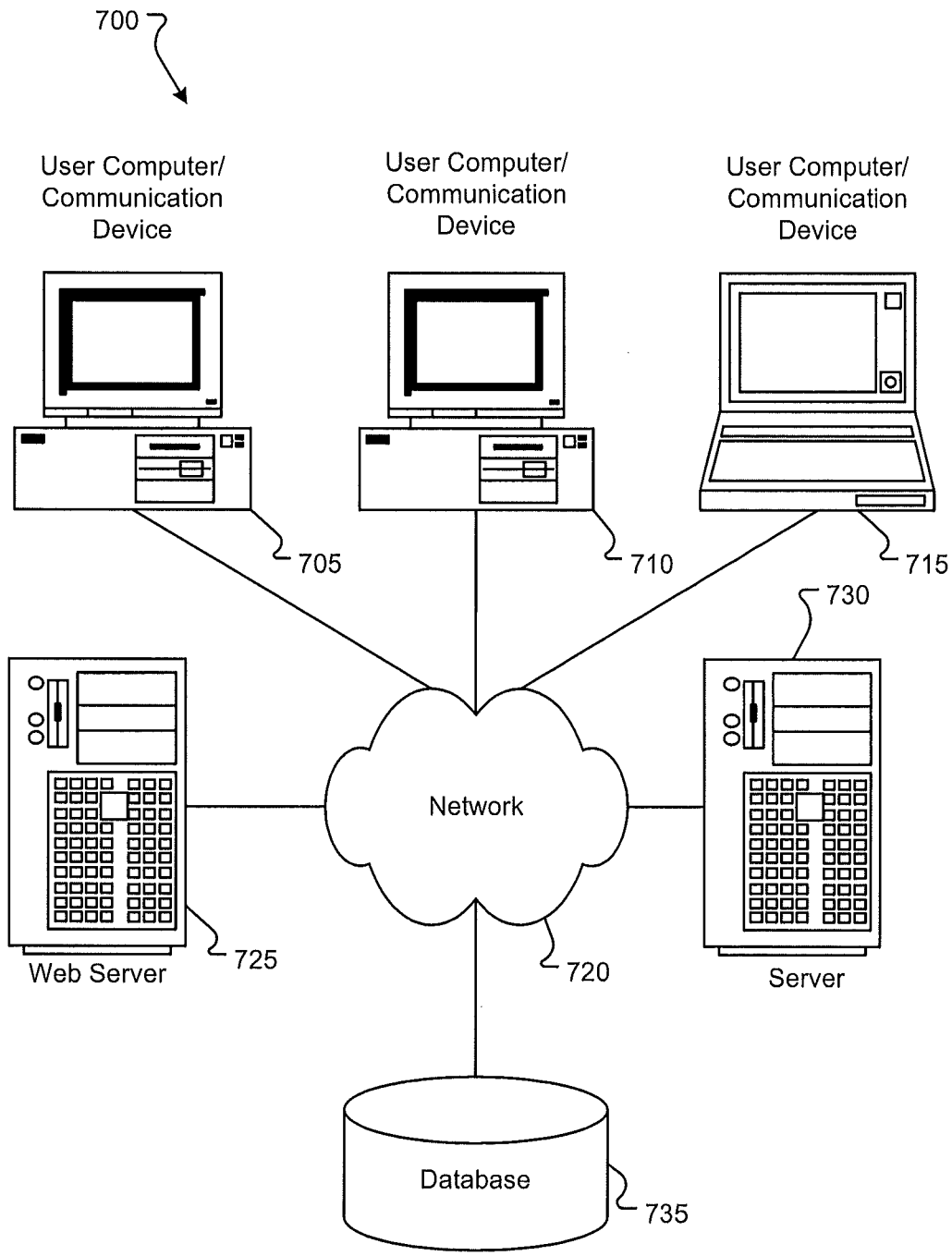
FIG. 7 is a block diagram of a computing environment possibly used in accordance with embodiments of the present disclosure.
Figure 8:
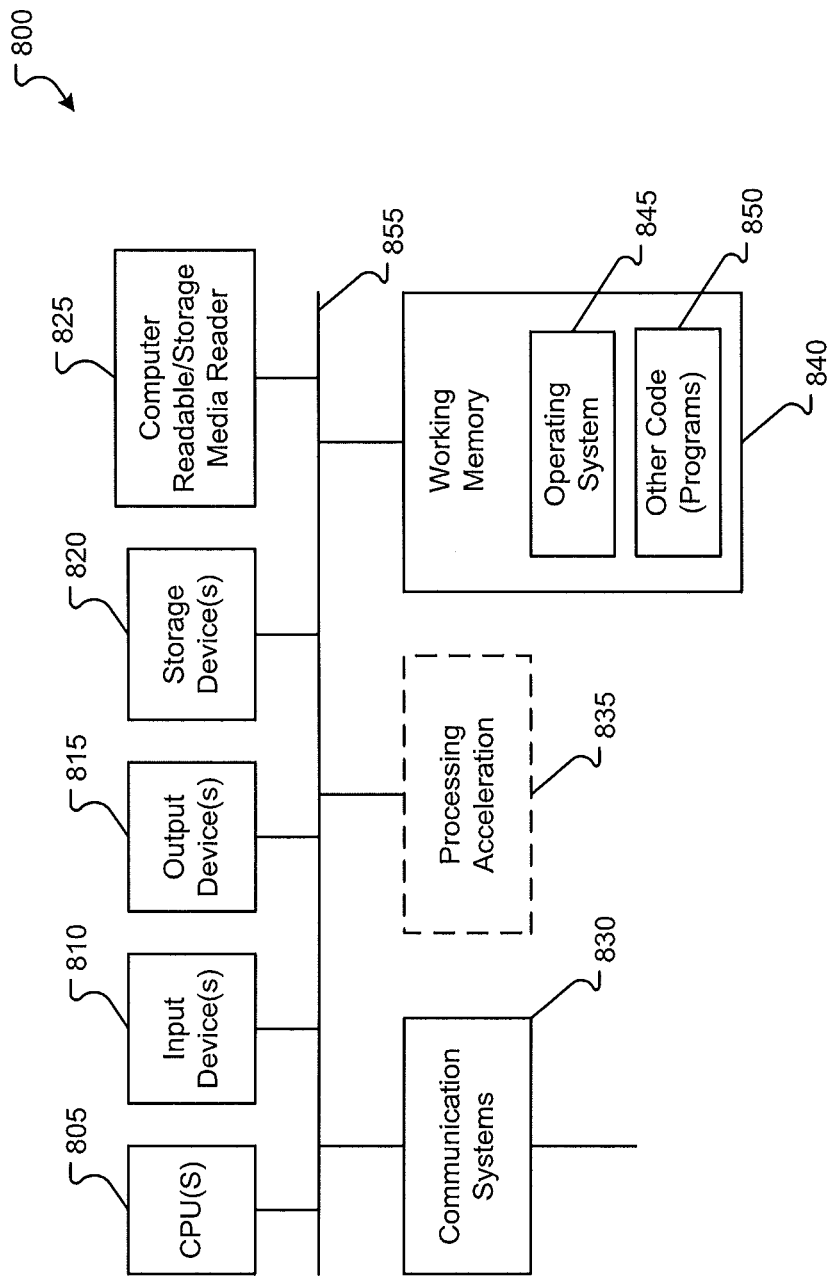
FIG. 8 is a block diagram of a computer or computing system possibly used in accordance with embodiments of the present disclosure.

The computers, computer systems, servers, devices, and/or components that are described herein and that may execute the processes described herein may be as described in conjunction with FIGS. 7 and 8. FIG. 7 illustrates a block diagram of a computing environment 700. The system 700 includes one or more computers 705, 710, and 715. The computers 705, 710, and 715 may be general purpose personal computers (including, merely by way of example, personal computers and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computers 705, 710, 715 may also have any of a variety of applications, including for example, database client and/or server applications, and web browser applications. Alternatively, the computers 705, 710, and 715 may be any other electronic device, such as a thin-client computer, mobile telephone, mobile device, Internet-enabled mobile telephone, and/or personal digital assistant, capable of communicating via a network (e.g., the network 720 described below) and/or displaying and navigating web pages or other types of electronic data. Although the exemplary system 700 is shown with three computers, any number of computers may be supported.

System 700 further includes a network 720. The network 720 may can be any type of network familiar to those skilled in the art that can support data communications using any of a variety of commercially-available protocols, including without limitation TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth® protocol known in the art, and/or any other wireless protocol); and/or any combination of these and/or other networks.

The system 700 may also include one or more server computers 725 and 730. One server may be a web server 725, which may be used to process requests for web pages or other electronic documents from user computers 705, 710, and 720. The web server can be running an operating system including any of those discussed above, as well as any commercially-available server operating systems. The web server 725 can also run a variety of server applications, including HTTP servers, FTP servers, CGI servers, database servers, Java servers, and the like. In some instances, the web server 725 may publish operations available operations as one or more web services.

The system 700 may also include one or more file and or/application servers 730, which can, in addition to an operating system, include one or more applications accessible by a client running on one or more of the user computers 705, 710, 715. The server(s) 730 may be one or more general purpose computers capable of executing programs or scripts in response to the user computers 705, 710 and 715. As one example, the server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 705 and can forward the web page requests and/or input data to the web application server 730. In further embodiments, the server 730 may function as a file server. Although for ease of description, FIG. 7 illustrates a separate web server 725 and file/application server 730, those skilled in the art will recognize that the functions described with respect to servers 725, 730 may be performed by a single server and/or a plurality of specialized servers, depending on implementation-specific needs and parameters.

The system 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i®, that is adapted to store, update, and retrieve data in response to SQL-formatted commands.

FIG. 8 illustrates one embodiment of a computer system 800 upon which the test system may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices, such as a random access memory ("RAM") and/or a read-only memory ("ROM"), which can be programmable, flash-updateable, and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 835, which can include a DSP, a special-purpose processor and/or the like The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 820 and/or any other computer described above with respect to the system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices, and/or other machine readable mediums for storing information.

The computer system 800 may also comprise software elements, shown as being currently located within a working memory 840, including an operating system 845 and/or other code 850, such as program code implementing the components and software described herein. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of computer-readable or machine-executable instructions, which may be used to cause a machine, such as a general-purpose or special-purpose processor or logic circuits programmed with the instructions to perform the methods. These computer-readable or machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of computer-readable or machine-readable mediums suitable for storing electronic instructions. Alternatively, the methods may be performed by a combination of hardware and software.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A non-transitory computer readable medium having stored thereon instructions that cause a computing system to execute a method, the instructions comprising:

instructions to receive a work item having one or more attributes that enable a routing decision to be made with respect to routing the work item among a plurality of resources in a contact center;
instructions to generate an initial bitmap for the work item;
instructions to search a dictionary database for a qualifier set definition similar to the initial bitmap;
if a similar qualifier set definition is found, instructions to provide the qualifier set definition with the work item;
if a similar qualifier set definition is not found, instructions to define a new qualifier set definition for the work item;
instructions to include the work item in a work pool that includes work items associated with customers;
instructions to compare the one or more attributes of the work item with attributes of the plurality of resources;
instructions to select, based on the comparing step, a first resource from the plurality of resources to receive the work item; and
instructions to route the work item to the first resource.

2. The computer readable medium of claim 1, wherein the dictionary database includes at least one previously created qualifier set definition.

3. The computer readable medium of claim 1, further comprising determine attribute data associated with the work item to create the initial bitmap.

4. The computer readable medium of claim 1, further comprising storing the new qualifier set definition in the dictionary database.

5. The computer readable medium of claim 1, further comprising:
instructions to receive an event;
in response to the event, instructions to manage the dictionary database; and
instructions to commit changes to the dictionary database.

6. A contact center, comprising:
a work assignment mechanism including:
    a work assignment engine configured to compare attributes of work items in a work pool with attributes of resources in a resource pool and match the work items to resources based on the comparison of attributes; and
    a service matcher configured to:
        receive a work item having one or more attributes that enable a routing decision to be made with respect to routing the work item among a plurality of resources in a contact center;
        generate an initial bitmap for the work item;
        search a dictionary database for a qualifier set definition similar to the initial bitmap;
        if a similar qualifier set definition is found, provide the qualifier set definition with the work item, wherein the qualifier set definition is common between two or more work items; and
        if a similar qualifier set definition is not found, define a new qualifier set definition for the work item and provide the new qualifier set definition to the work assignment engine.

7. The contact center of claim 6, wherein the service matcher comprises:
a data ingest module configured to receive or collect data associated with the work item;
an attribute determination module configured to generate the initial bitmap associated with the data collected by the data ingest module;
a bitmap research module configured to search for a qualifier set definition in the dictionary database that is similar to the initial bitmap; and a bitmap definition module configured to define the new qualifier set definition for the work item, based on the initial bitmap, if the bitmap research module fails to find a qualifier set definition in the dictionary database that is similar to the initial bitmap.

8. The contact center of claim 6, wherein the bitmap definition module is further configured to store the new qualifier set definition in the dictionary database.

9. The contact center of claim 6, wherein the bitmap definition module is further configured to provide the new qualifier set definition to the work assignment engine.

10. The contact center of claim 6, wherein the bitmap definition module is further configured to:
- receive an event;
- in response to the event, manage the dictionary database; and
- commit changes to the dictionary database.

* * * * *